US 10,353,570 B1

United States Patent
Letourneur

(10) Patent No.: US 10,353,570 B1
(45) Date of Patent: Jul. 16, 2019

(54) THUMB TOUCH INTERFACE

(71) Applicant: Amazon Technologies, Inc., Seattle, WA (US)

(72) Inventor: Herve Jacques Clement Letourneur, San Francisco, CA (US)

(73) Assignee: Amazon Technologies, Inc., Seattle, WA (US)

(*) Notice: Subject to any disclaimer, the term of this patent is extended or adjusted under 35 U.S.C. 154(b) by 281 days.

(21) Appl. No.: 15/206,173

(22) Filed: Jul. 8, 2016

Related U.S. Application Data

(63) Continuation of application No. 13/857,043, filed on Apr. 4, 2013, now Pat. No. 9,389,718.

(51) Int. Cl.
  *G06F 3/0488* (2013.01)
  *G06F 3/0482* (2013.01)
  *G06F 3/041* (2006.01)

(52) U.S. Cl.
  CPC .......... *G06F 3/0488* (2013.01); *G06F 3/0412* (2013.01); *G06F 3/0414* (2013.01); *G06F 3/0482* (2013.01); *G06F 2203/04108* (2013.01)

(58) Field of Classification Search
  CPC .... G06F 3/0488; G06F 3/0414; G06F 3/0482; G06F 3/0412; G06F 2203/04108
  See application file for complete search history.

(56) References Cited

U.S. PATENT DOCUMENTS

| | | | |
|---|---|---|---|
| 2005/0110769 A1 | 5/2005 | DaCosta et al. | |
| 2008/0184172 A1 | 7/2008 | Lection | |
| 2008/0202823 A1 | 8/2008 | Won et al. | |
| 2009/0077464 A1 | 3/2009 | Goldsmith et al. | |
| 2009/0122022 A1 | 5/2009 | Park et al. | |
| 2009/0293009 A1 | 11/2009 | Meserth et al. | |
| 2011/0102351 A1 | 5/2011 | Seo | |
| 2011/0141053 A1* | 6/2011 | Bulea | G06F 3/0416 345/174 |
| 2012/0030619 A1 | 2/2012 | Lee et al. | |
| 2012/0032979 A1 | 2/2012 | Blow et al. | |
| 2013/0185642 A1 | 7/2013 | Gammons | |

OTHER PUBLICATIONS

Office action for U.S. Appl. No. 13/857,043 dated Nov. 20, 2015, Letourneur, "Thumb Touch Interface", 32 pages.

Office Action for U.S. Appl. No. 13/857,043, dated Mar. 13, 2015, Herve Jacques Clement Letourneur, "Thumb Touch Interface", 25 pages.

\* cited by examiner

*Primary Examiner* — Andrew Sasinowski
(74) *Attorney, Agent, or Firm* — Lee & Hayes, P.C.

(57) ABSTRACT

In some examples, an electronic device may present a user interface that is configured to be controlled using a thumb of a single hand that is holding the device. For instance, the interface may present a plurality of selectable items, each of which may correspond to a respective one of a plurality of touch input areas on the display. In some cases, the touch input areas are within reach of the thumb, while the selectable items may be displayed on an area of the display that is not within reach of the thumb. The thumb may be pressed against the display surface with a force greater than a force threshold to select one of the selectable items. Thus, the thumb may be used to interact with the interface while remaining in contact with the display surface, enabling the user to maintain a grip on the device.

20 Claims, 14 Drawing Sheets

THUMB TOUCH INTERFACE

This Application is a continuation of and claims priority to U.S. application Ser. No. 13/857,043, titled "Thumb Touch Interface", filed on Apr. 4, 2013, the entirety of which is incorporated herein.

BACKGROUND

People use handheld, mobile or other portable electronic devices for a variety of purposes, such as making telephone calls, texting, accessing the Internet, sending and receiving email, viewing, playing or consuming digital content, executing applications, playing games, navigation, and numerous other functions. Some of these devices are small enough and light enough to be held in a single hand. Further, some of these devices include user interfaces that may be operated using touch inputs. However, many of these devices typically require two-handed operation for performing many functions, such as by the user holding the device in one hand and interacting with the user interface using another hand.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes techniques and arrangements for a touch-based user interface to enable interacting with an electronic device using a single hand that is also holding the device. For instance, the user interface may be operable using a thumb of the hand holding the device for navigating and interacting with the user interface. In some examples, a combination of touch location sensing and touch force sensing are employed to enable the user interact with the user interface. For example, the user may use a thumb of the same hand that is holding the device to navigate through one or more menus of the user interface without lifting the thumb from contact with a display of the device. Accordingly, the user may use a single hand to hold the device and also view or scroll through selectable items, such as menu options, user interface controls, and the like, by sliding the thumb to different areas of the display surface while the thumb remains in contact with the display surface.

The user may make a selection in the user interface (e.g., select a highlighted selectable item) by squeezing or pressing the thumb against the display surface. Thus, the electronic device may use location sensing to track the position of the thumb on the display. Further, the electronic device may include a force sensing to detect an amount of force of a squeezing or pressing action of the thumb against the display. If the amount of force exceeds a force threshold, the user interface may register the action as a selection of a selectable item in the user interface. Thus, a user may navigate and interact with the user interface without having to lift his or her thumb off the display surface. Therefore, the electronic device remains firmly within the user's grasp while the user interacts with the user interface. Consequently, the user is able to use a single hand to hold, support or grasp the electronic device and also interact with the electronic device.

For discussion purposes, some examples are described in the environment of touch interface for use with a handheld or portable electronic device. However, the implementations herein are not limited to the particular examples provided, and may be extended to other types of interfaces, other types of interactions, and other types of electronic devices, as will be apparent to those of skill in the art in light of the disclosure herein.

Figure 1:
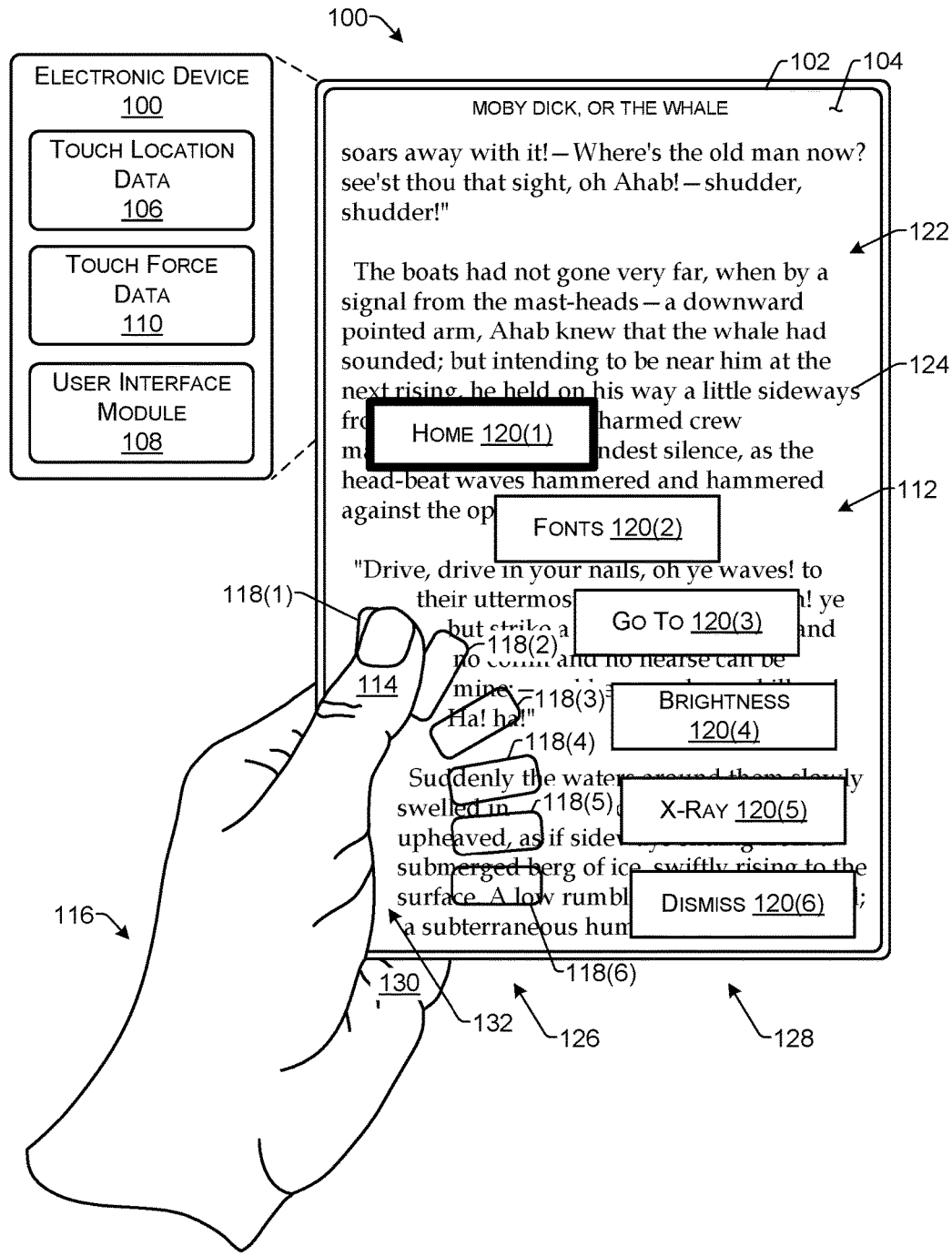
FIG. 1 illustrates an example portable electronic device with a thumb touch interface according to some implementations.

FIG. 1 depicts an example electronic device 100 configured for single-hand thumb touch interaction according to some implementations. The electronic device 100 may be a user-transportable device, a mobile device, or other portable device, and may be implemented as any of a number of different types of electronic devices, such as a tablet computing device, an electronic book (eBook) reader device, a media player, a navigation device, a cellphone, a smart phone, a portable gaming device, a laptop computer, or any other portable or mobile electronic device capable of being grasped by a hand.

In the example of FIG. 1, the device 100 includes a touch sensitive display 102 that is able to detect the location of a touch input, such as from a finger, thumb, other body part, stylus or the like. As discussed below, in some examples, the touch sensitive display 102 may include a touch location sensor (not shown in FIG. 1), such as a capacitive sensor, for sensing the location of one or more touch inputs. For example, the touch location sensor may detect a touch location of a touch input made to a display surface 104 of the display 102, and may provide touch location data 106 to a user interface module 108. In addition, the electronic device 100 may include a touch force sensor (not shown in FIG. 1), such as one or more resistive sensors, strain sensors, or the like, for sensing a force associated with a touch input. For example, the touch force sensor may provide touch force data 110 to the user interface module 108 to indicate an amount of force associated with a touch input made to the display surface 104. In addition, some examples of the electronic device 100 may include various external controls and input devices that are not shown in this example for performing various other desired inputs and interactions with the electronic device 100.

The user interface module 108 may employ the touch location data 106 and the touch force data 110 for controlling interaction with a user interface 112 presented on the display 102. For example, a thumb 114 of a user may be used to interact with the user interface 112, which enables the user to use a single hand 116 to both hold the electronic device 100 and interact with the electronic device 100 via the user interface 112. The user interface 112 may include a plurality of touch input targets or areas 118 on the display surface 104 that a user may touch with the thumb 114 for interacting with the user interface 112. In this example, the user interface 112 includes six touch input areas 118(1), 118(2), 118(3), 118(4), 118(5) and 118(6); however, in other examples, more or fewer touch input areas 118 may be included.

The user interface 112 may further include a virtual selectable item 120 associated with each touch input area 118. For instance, a selectable item 120 may be an icon, graphical element or other visual representation presented on the display that represents a menu item, a control, a button, or other virtual item able to be selected by a user for performing a function, executing a command, making a selection, or the like. Further, each respective touch input area 118 may be more proximate to its associated selectable item 120 than others of the touch input areas. Thus, a selectable item 120(1) is associated with the touch input area 118(1), a selectable item 120(2) is associated with the touch input area 118(2), a selectable item 120(3) is associated with the touch input area 118(3), a selectable item 120(4) is associated with the touch input area 118(4), a selectable item 120(5) is associated with the touch input area 118(5), and a selectable item 120(6) is associated with the touch input area 118(6). In this example, the selectable items 120 represent possible menu selections, such as a "home" selectable item 120(1), a "fonts" selectable item 120(2), a "go to" selectable item 120(3), a "brightness" selectable item 120(4), an "x-ray" selectable item 120(5) and a "dismiss" selectable item 120(6). For instance, the user interface 112 may be displayed overtop of another interface 122 such as, in this example, an interface for presenting a digital content item 124, such as an electronic book. For example, the interface 122 may be presented by a book reader application, a media player application, an operating system, or the like. Accordingly, in some cases, the user interface 112 presents selectable items 120 that may be used for interacting with the digital content item 124, the interface 122 and/or the electronic device 100. For instance, the user may select the "home" selectable item 120(1) to open a home menu on the electronic device 100; the "fonts" selectable item 120(2) may be selected to adjust the font appearance in the interface 122; the "go to" selectable item 120(3) may be selected to go to another portion of the digital content item 124; the "brightness" selectable item 120(4) may be selected to adjust the brightness of the display 102; the "x-ray" selectable item 120(5) may be selected to open an interface for viewing supplemental information related to the content item 124; and the "dismiss" selectable item 120(6) may be selected to dismiss or close the user interface 112.

When the user's thumb 114 is touching one of the touch input areas 118, the associated selectable item 120 may be visually distinguished from the other selectable items 120 currently presented on the display 102, such as by highlighting, outlining, changing color, changing a pattern, changing a font, changing a size, changing a shape, or any of numerous other possible techniques for visually distinguishing one graphical element from another. In this example, the user's thumb 114 is illustrated as currently touching the touch input area 118(1), and as a result, the "home" selectable item 120(1) is visually distinguished from the other selectable items 120(2)-120(6). The user may move the thumb 114 along the display surface 104 within a thumb radius area 126 of the display 102. For example, the thumb radius area 126 may include the touch input areas 118 that may be touched by or are within reach of the user's thumb 114 while the user grasps the device 100 with the hand 116. For example, the selectable items 120 may be presented within a separate second area 128 of the display 102, spaced laterally away from the touch input areas 118, so as to be visible regardless of which touch input area 118 is occupied by the user's thumb 114. In other words, in this example, the selectable items 120 may be located outside of the thumb radius area 126, and thus outside of the reach of the user's thumb 114 while the user is holding the electronic device with the single hand 116. For example, the selectable items 120 may be outside of the reach of a thumb of a user having average sized hands while the thumb is in a currently detected position, such as the single hand grip shown in FIG. 1. Thus, while the selectable items 120 are outside the touch input areas 118, each touch input area 118 may be more proximate to its respective selectable item 120 than the other touch input areas 118. However, in other examples, the selectable items 120 may be located within reach of the user's thumb, i.e., within the thumb radius area 126 such as within the touch input areas 118, or at least partially within the touch input areas 118.

As one example, the thumb radius area 126 may encompass the potential touch radius of the thumb 114 while the device 100 is grasped between the user's palm 130 and the user's thumb 114. Thus, the user is able to touch any of the touch input areas 118 by sliding the thumb 114 along the display surface 104. Further, because the user does not need to lift the thumb off the display surface 104 to move from one touch input area 118 to the next, the user is able to maintain a secure grip on the electronic device 100 while interacting with the user interface 112. As discussed additionally below, when the user desires to select one of the selectable items 120, the user may squeeze or press the thumb 114 against the display surface 104 with a force greater than a threshold amount to make a selection of a particular selectable item 120 that is currently visually distinguished from the other selectable items 120.

Furthermore, in this example, visual indicators, such as outlines of the touch input areas 118 are presented on the display 102 when the interface 112 is presented on the display 102. Accordingly, each touch input area 118 may be represented by a displayed shape or graphical element present in an area of the display 102 within which the user may touch with the thumb 114. For instance, each touch input area 118 may be indicated by an outline, a solid or translucent shape, dashed lines, a pattern, or other graphical elements. Additionally, as in the illustrated example, the touch input areas 118 may be designated by discrete shapes such as squares, rectangles, ovals, circles, and so forth, and may have spaces in between each adjacent touch input area 118. Alternatively, as discussed additionally below, in some examples, the touch input areas 118 may be contiguous with adjacent touch input areas 118. Further, in other examples, the touch input areas 118 may not have any visual indicators or graphical elements presented on the display 102 when the user interface 112 is presented. For example, the user can determine which touch input area 118 the user's thumb is currently touching based on which of the selectable items 120 is currently visually distinguished from the other selectable items 120.

In addition, in this example, the electronic device 100 may be configured to automatically reflow or rearrange the displayed text of the digital content item 124 around the user's thumb 114 based on the detected location of the user's thumb 114. For instance, a content-free buffer area 132 may be maintained around the user thumb 114 as the user moves the thumb 114 or repositions the thumb 114 on the display surface 104. Thus, the content-free buffer area may be maintained under the thumb and around a portion of the display that may be obstructed by the thumb 114. Accordingly, the content-free buffer area 132 provides a blank space around the thumb 114 and thereby allows the entire text of the digital content item 124 to be visible to the user regardless of the location of the user's thumb on the display 102. Further, as the user moves the thumb 114 relative to the display 102, the content-free buffer area 132 may be moved with the thumb 114 and maintained around the thumb 114 by dynamically rearranging the text of the content item as the thumb is moved.

In some examples, the user interface 112 may be activated or otherwise caused to be presented on the display 102 by the user squeezing the display with sufficient force, such as by squeezing one time with an amount of force greater than a force threshold. Further, in some examples related to text content items, as discussed below, when the user squeezes once and releases before a time threshold is reached, the interface 122 may turn a page of the digital content item 124. On the other hand, if the user squeezes and holds the squeeze for longer than the time threshold, the user interface 112 may be presented. Numerous other techniques for causing the user interface 112 to be presented will be apparent to those of skill in the art in light of the disclosure herein. When the interface 112 is presented, the user may subsequently select a desired selectable item 120 by sliding the thumb 114 to a corresponding touch input area 118 on the display surface 104 and making the selection by squeezing with the thumb 114 using a force that exceeds a force threshold. Thus, implementations herein enable a single hand to be used for both grasping and interacting with the electronic device 100.

Figure 2:
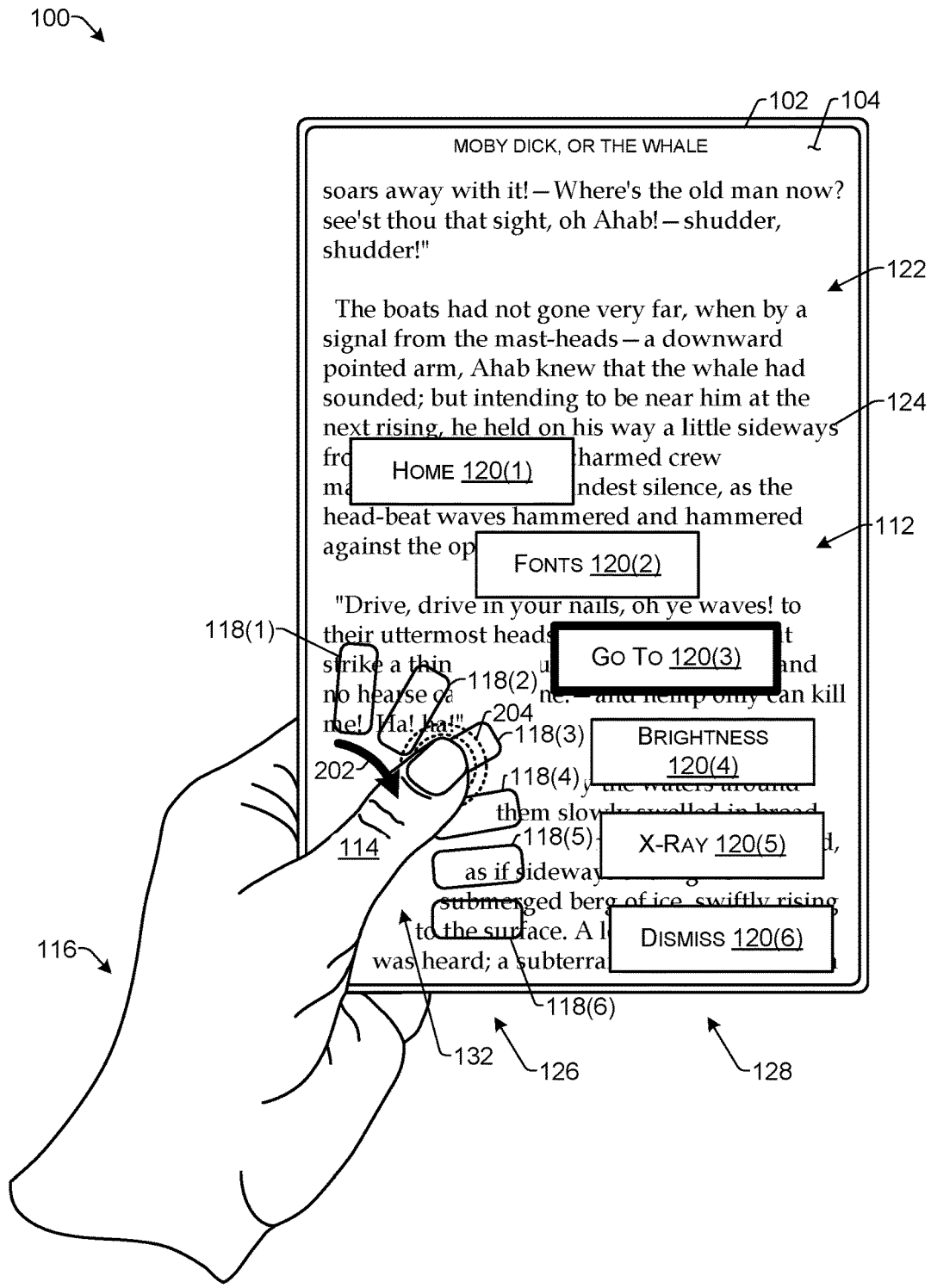
FIG. 2 illustrates an example of interaction using a thumb touch interface according to some implementations.

FIG. 2 illustrates an example of interaction using the user interface 112 according to some implementations. In this example, as indicated by arrow 202, the user moves the thumb 114 from the first touch input area 118(1) to the third touch input area 118(3). For example, the user may slide the thumb 114 along the display surface 104 from the first touch input area 118(1) to the third touch input area 118(3) without lifting the thumb 114 from the display surface 104 thereby maintaining a secure grip on the electronic device 100. As the user moves the thumb 114 from the first touch input area 118(1) to the second touch input area 118(2), the interface 112 ceases to visually distinguish the "home" selectable item 120(1), and the "fonts" selectable item 120(2) may be briefly visually distinguished (not shown in FIG. 2). As the user continues to move the thumb 114 to the third touch input area 118(3), the "go to" selectable item 120(3) is visually distinguished, as shown, and the "fonts" selectable item 120(2) is no longer visually distinguished.

Suppose that the user desires to select the "go to" selectable item 120(3), such as for navigating to a different part of the content item 124. The user may squeeze or press down with the thumb 114 against the display surface 104 to apply a force as indicated by dashed lines 204. For example, the amount of force applied by the user's thumb 114 may exceed a threshold amount of force for making a selection in the interface 112, and thus may be greater than the force applied by the user's thumb when merely holding or grasping the electronic device 100 with the hand 116. One or more indicators may be provided to the user to indicate that a sufficient force is been applied and the selection has been made, such as by providing an audible click, visually changing the appearance of the selected "go to" item 120(3), providing a haptic feedback, or any combination thereof. Further, in some examples, the user may alternatively use a second hand, such as a finger of a second hand (not shown in FIG. 2) to select a desired selectable item 120, such as by touching the display surface 104 directly over the desired selectable item 120.

Figure 3:
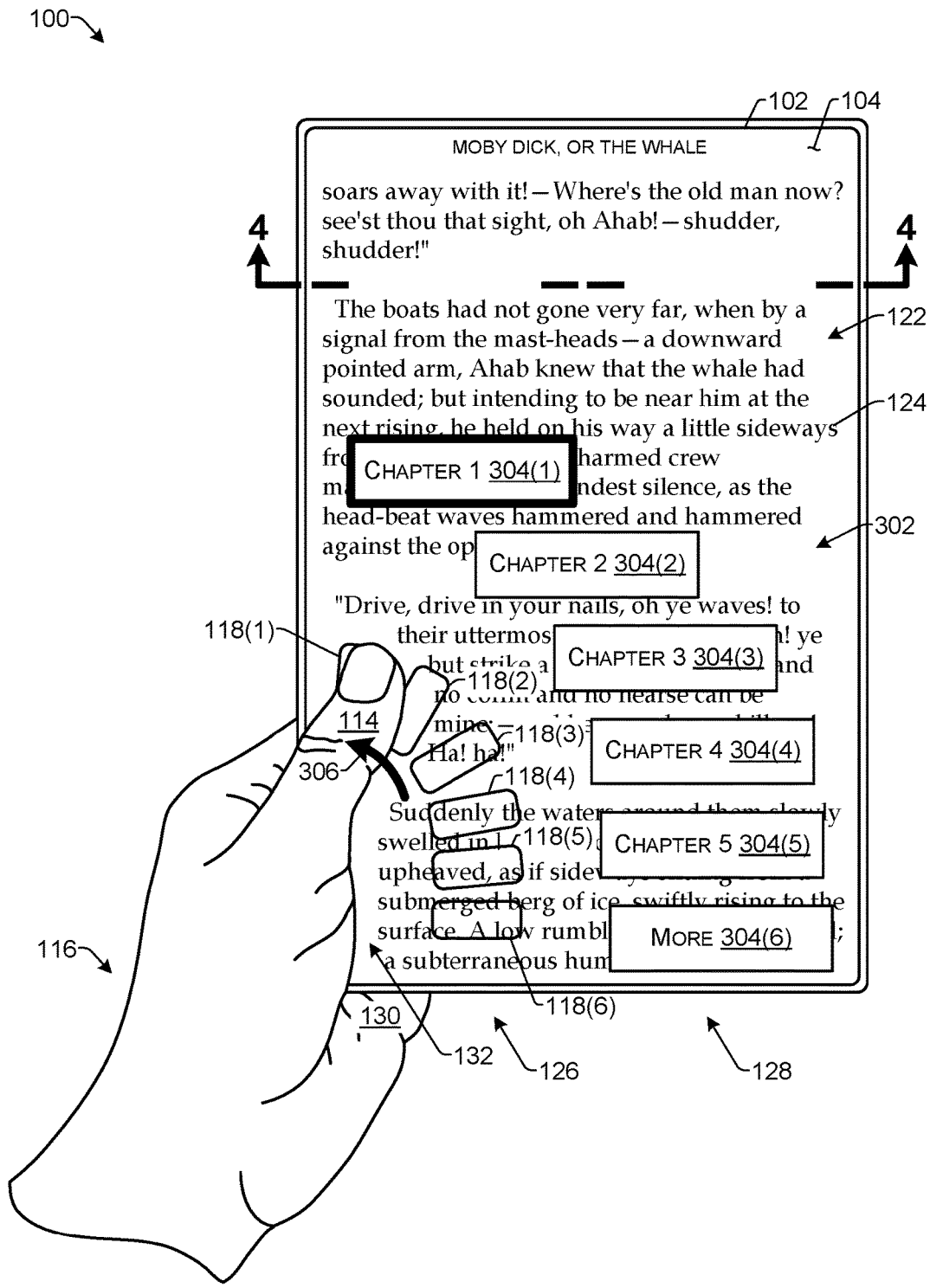
FIG. 3 illustrates an example of interaction using a thumb touch interface according to some implementations.

FIG. 3 illustrates an example user interface 302 that may be presented as a result of the selection of the "go to" selectable item 120(3) made in FIG. 2 according to some implementations. In this example, the user interface 302 includes a different plurality of selectable items 304(1)-304(6) each associated with respective ones of the plurality of touch input areas 118(1)-118(6). Further, each of the selectable items 304 may correspond to a chapter of the content item 124 to which the user may navigate, with the exception of the "more" item 304(6), which may be selected to view the next set of chapters, e.g., chapters 6 through 9, along with a "back" item or button.

Suppose that the user desires to view chapter 1 of the content item 124. The user may slide the thumb 114 in the direction of arrow 306 to the first touch input area 118(1). For example, the user's thumb 114 may maintain contact with the display surface during movement from the third touch input area 118(3) to the first touch input area 118(1). The touch input of the thumb 114 detected at the first touch input location 118(1) results in the chapter 1 item 304(1) being visually distinguished from the other selectable items 304(2)-304(6). The user may then select the "chapter 1" selectable item 304(1) by squeezing or pressing the thumb 114 on the display 102 with a force that exceeds the force threshold amount. In response to the selection, the electronic device 100 may cause the interface 122 to display the first chapter of the content item 124. In some examples, the user interface 302 may then automatically disappear or no longer be presented on the display 102, while in other examples, the user may then select a dismiss selectable item, or the like, as discussed above.

Figure 4:
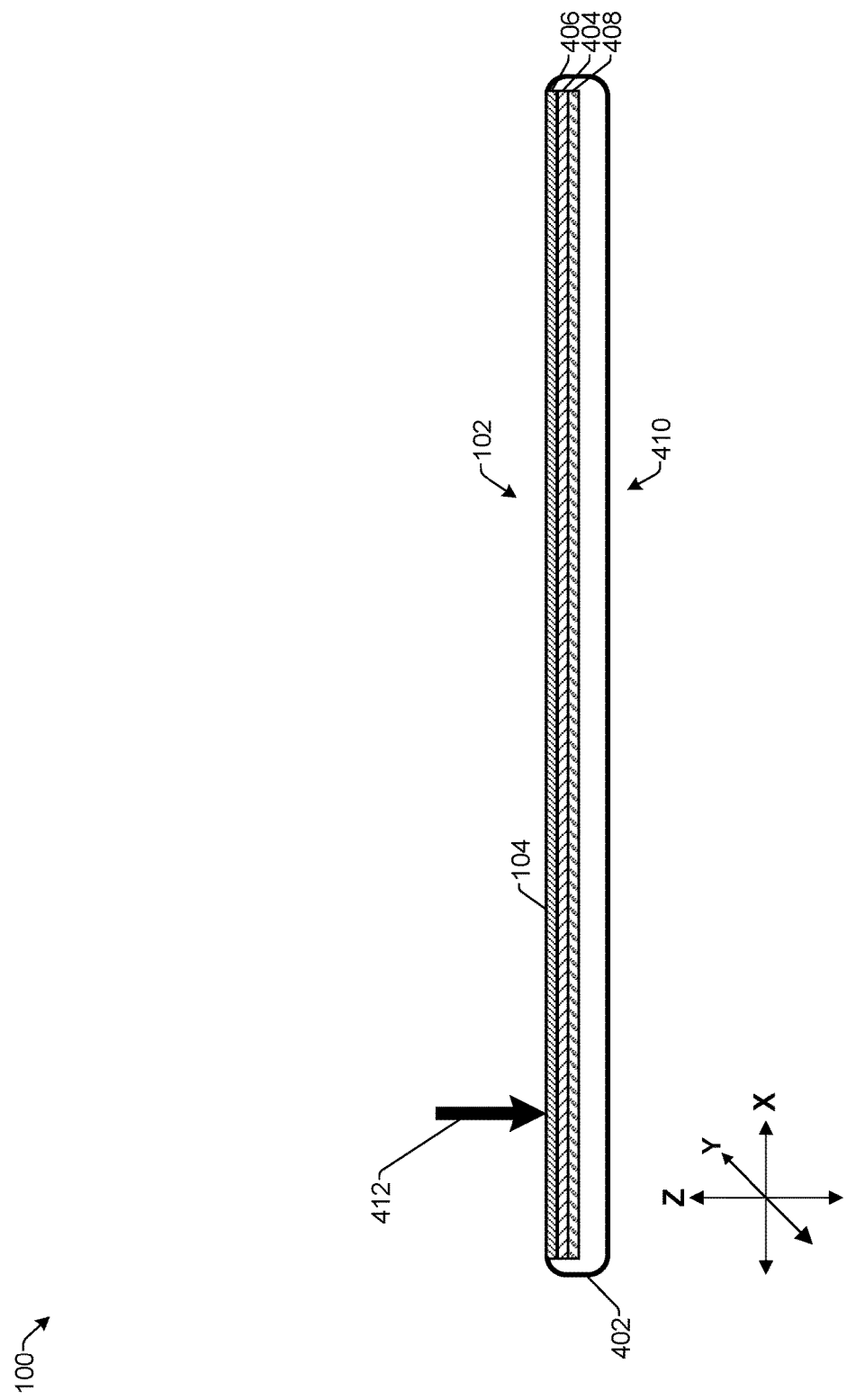
FIG. 4 is a cross sectional view of an example electronic device according to some implementations

FIG. 4 illustrates a cross-sectional view, such as taken along line 4-4 of FIG. 3, of an example of the electronic device 100 according to some implementations. In this example, the display 102 is located within a housing 402 of the electronic device 100. The display 102 may include a display panel 404, and may have associated therewith a touch location sensor 406 and a touch force sensor 408. In some examples, the touch location sensor 406 may be a capacitive type touch sensor including a grid of intercrossed conductive lines or elements. The touch location sensor may sense the location of a touch input in an x-y plane corresponding to a plane of the display panel 404 based on changes in capacitance caused by the presence of a conductive object such as the thumb 114. In the illustrated example, the touch location sensor 406 may be generally transparent and located over top of the display panel 404. In other examples, however, the touch location sensor 406 may be located underneath the display panel 404. Further, in other examples, the touch location sensor may be any other type of touch location sensor, such as a sensor that employs visible light or infrared light to determine a touch location on a display.

As one example, the touch force sensor 408 may be a resistive type touch force sensor including a grid of a plurality of intercrossed plurality conductive lines or elements able to indicate an applied force based on changes in resistance of individual elements at a location of the applied force. In the illustrated example, the touch force sensor 408 is shown as a layer underneath the display panel 404 and the touch location sensor 406. However, in other implementations, one or both of the display panel 404 and/or the touch location sensor 406 may be located underneath the touch force sensor 408. Alternatively, in some cases, rather than a layer 408, one or more individual force sensors, such as one or more force sensing resistors, strain sensors, or the like, may be located under the display panel 404 to sense a force applied to the display surface 104.

Further, in some examples, the touch location sensor 406 and the touch force sensor 408 may be a single sensor able to indicate both a location of a touch input and an amount of force applied by the touch input. For instance, a sufficiently sensitive capacitive touch sensor may detect a change in the surface area of a thumb pressed against the display surface 104 for estimating an amount of force applied by the thumb. As another example, some examples of a resistive grid force sensor may also indicate a location of the touch input as well as an amount of force applied by the touch input. Additionally, in some examples, the touch sensor may be able to distinguish a thumb from other digits of the hand, other body parts, or other types of input devices. For instance, the device may recognize a capacitive profile that indicates the presence of a user's thumb in contact with the display, and may distinguish this profile from the capacitive profiles associated with other fingers, body parts or input devices. Thus, upon recognizing that a user's thumb is in contact with the display surface, such as in a single hand grip or other configuration similar to that shown in FIG. 1, the device may present the thumb touch interfaces described herein, e.g., in response to any of the user inputs described herein for causing the thumb touch user interface to be presented. On the other hand, if the device does not detect the presence of the user's thumb in contact with the display surface, but instead recognizes a profile of a different type of input object, such as a finger or stylus, then, in some examples, the device may present a conventional touch interface. Other variations and other types of sensors suitable for use with the implementations herein will be apparent to those of skill in the art having the benefit of this disclosure.

When a touch input is applied to the display surface 104 as indicated by the arrow 412, the touch location sensor 406 may indicate a location of the touch input and, in some examples, may further provide data indicative of a shape of the touch input and/or an object used to make the touch input. Further, the touch force sensor 408 may indicate an amount of force applied to the display 102 by the touch input. For instance, a user may grip the electronic device 100 in a single hand (not shown in FIG. 4) by placing the palm and fingers of the hand on a back side 410 of the electronic device while placing the pad of the thumb and the heel of the thumb on the front side of the display 102 of the device 100. Accordingly, the user may squeeze against the display surface 104 in the direction of arrow 412 along a z-axis direction to apply a force that exceeds a force threshold when making a selection in the above-described user interface.

Figure 5:
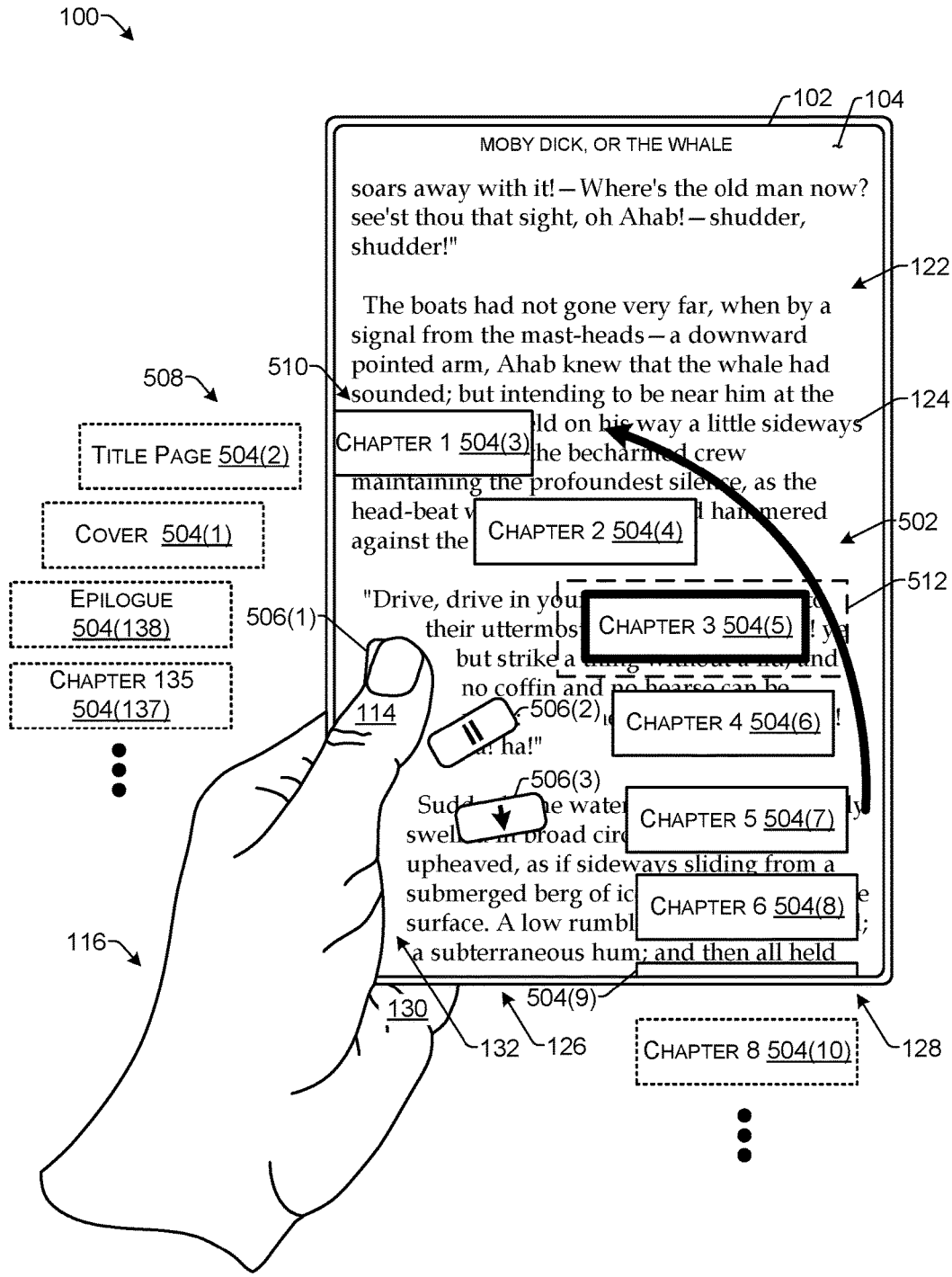
FIG. 5 illustrates an example of interaction using a thumb touch interface according to some implementations.

FIG. 5 illustrates an example user interface 502 for interaction using a thumb for touch input according to some implementations. For instance, in some types of menus or other interfaces, the number of selectable items may be too large to fit easily within the area of the display 102. In this example, the digital content item is Moby Dick by Herman Melville, which has 135 chapters in addition to an epilogue, a title page and a cover as selectable items 504(1) through 504(138). Accordingly, these selectable items 504 may be presented in a carousel arrangement in which only a portion or subset of the selectable items 504 are visible on the display 102 and the user is able to move the thumb 114 for controlling movement of the selectable items 504 by rotating the selectable items 504 onto and off of the display in a carousel manner.

Furthermore, in this example, rather than having a touch input area corresponding to each selectable item 504, the interface 502 includes three touch input areas 506(1), 506(2) and 506(3). For example, placing the thumb 114 at the first touch input area 506(1) may cause a carousel 508 of a plurality of the selectable items 504 to rotate in a counter-clockwise direction. Moving the thumb 114 to the second touch input area 506(2) may cause the carousel 508 to stop rotation. Moving the thumb 114 to the third touch input area 506(3) may cause the carousel 508 to rotate in the clockwise direction. Thus, a subset 510 of the plurality of selectable items 504 is presented on the display 102 at any one time, and as the carousel 508 is rotated, the subset 510 is continually replaced with additional subsets of the plurality of selectable items.

In addition, the rotation speed of the carousel 508 may be controlled based on the detected location of the thumb 114. For example, as the thumb 114 slides from the central second touch input area 506(2) toward the first touch input area 506(1), the speed of the carousel 508 in the counter-clockwise direction may increase, reaching a maximum rotation speed when the thumb 114 is located at the first touch input area 506(1). Movement of the thumb 114 back toward the second touch input area 506(2) may result in slowing the rotation speed of the carousel 508. When the thumb 114 is located over the second touch input area 506(2), the rotation of the carousel 508 may cease. Sliding of the thumb 114 from the second touch input area 506(2) toward the third touch input area 506(3) may cause the carousel 508 to begin rotating in the clockwise direction, with the speed of rotation in the clockwise direction increasing as the thumb 114 approaches the third touch input area 506(3).

If the user desires to select a particular one of the selectable items 504, the user may squeeze or press the thumb 114 down on the display surface 104 with the force that exceeds a threshold amount. For example, a selectable one of the selectable items 504 may be highlighted or otherwise visually distinguished as the carousel 508 rotates. Thus, as the carousel 508 rotates, and as each selectable item 504 approaches a focus area 512, that selectable item 504 may become visually distinguished, such as the "chapter 3" selectable item 504(5) in the example illustrated in FIG. 5. As each selectable item 504 leaves the focus area 512, the selectable item 504 is no longer visually distinguished and instead, the next selectable item rotated into the focus area 512 is visually distinguished.

The user may slow or stop rotation of the carousel 508 to enable accurate selection of a desired selectable item 504. The user may apply a force to the display surface 104 above a threshold amount to make the selection of the visually distinguished item. Alternatively, in other examples, the user may tap the second touch input area 506(2) to select an item 504, maintain contact of the thumb 114 at the touch input area 506(2) for an amount of time greater than a threshold amount time, or use various other techniques for selecting the visually distinguished selectable item 504. Thus, the carousel interface 502 may be used to traverse, view and/or make a selection from a large number of selectable items 504 without lifting the user's thumb 114 from contact with the display surface 104.

In addition, while the touch input areas 506(1), 506(2) and 506(3) are illustrated in FIG. 5 in this example as represented by visible graphical elements presented on the display 102, in other examples, the graphical elements may be different shades, different sizes, partially transparent, outlines, dashed lines, contiguous with adjacent graphical elements, and so forth. Further, in still other examples, no graphical elements are presented in the touch input areas 506, and instead the user may determine the position of the thumb 114 relative to the touch input areas 506 based on the movement characteristics of the carousel 508, highlighting of particular selectable items 504 in the focus area 512, and the like.

Figure 6A:
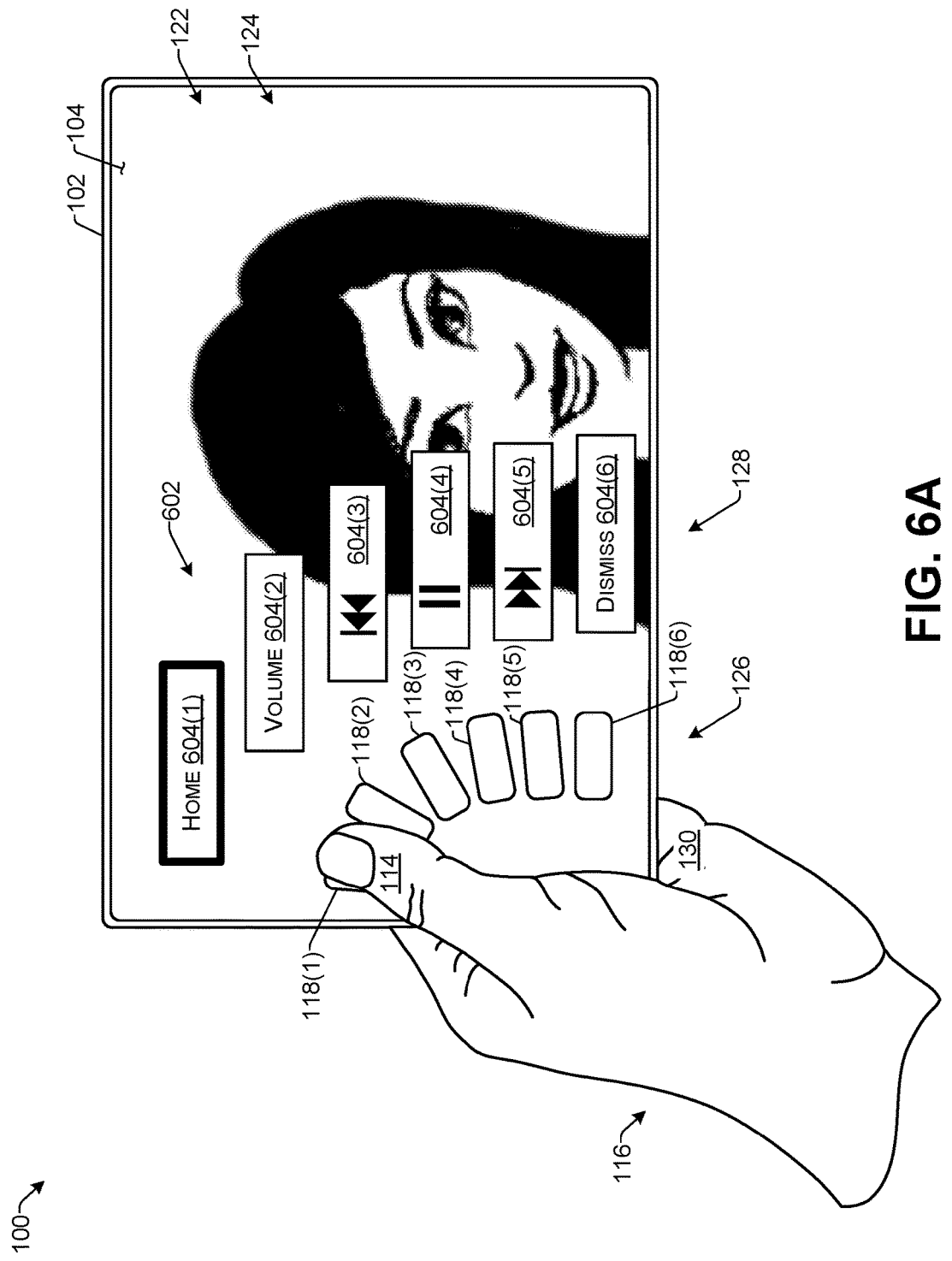
FIGS. 6A and 6B illustrate an example thumb touch interface for multimedia applications according to some implementations.
Figure 6B:
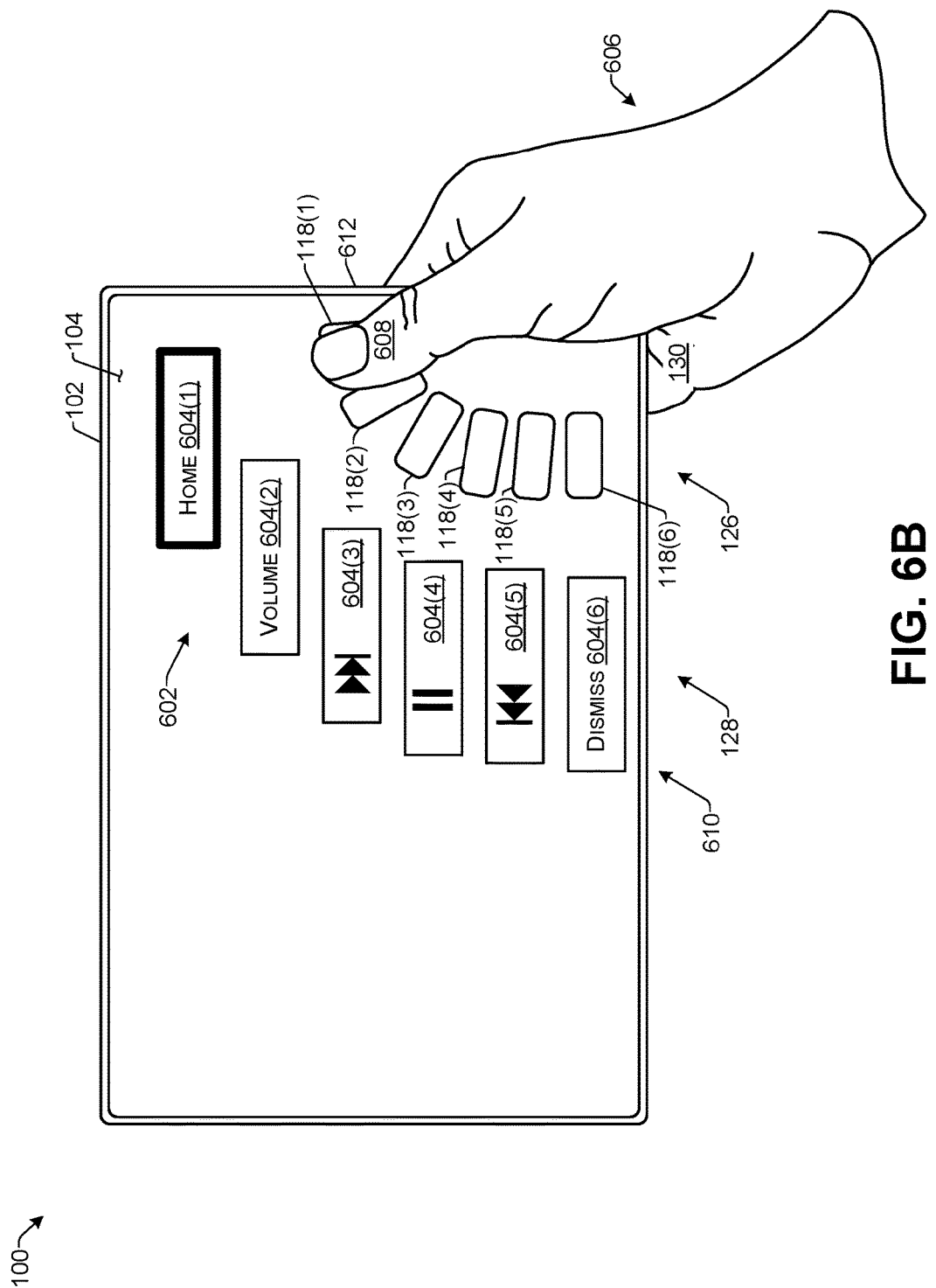

FIGS. 6A and 6B illustrate an example thumb touch interface 602 suitable for multimedia applications according to some implementations. For example, suppose that the user desires to watch a movie, a television show, view a slideshow, listen to music or other audio recordings, and so forth, using the electronic device 100. The user may rotate the device to a landscape mode and the electronic device 100 may present a content item 124 in the interface 122, such as video or images associated with the digital content item 124.

Further, when the thumb touch user interface 602 is activated, as discussed above, the electronic device 100 may automatically present the user interface 602 having suitable selectable items 604 determined based at least in part on the type of digital content item 124 being displayed in the interface 122. For example, the selectable items 604(1) through 604(6) may include a "home" selectable item 604(1), a "volume control" selectable item 604(2), a "back" selectable item 604(3), a "pause/play" selectable item 604(4), a "forward" selectable item 604(5) and a "dismiss" selectable item 604(6). Navigation of the selectable items 604 and/or selection of the selectable items 604 may be performed in a manner similar to that discussed above with respect to the interface 112 of FIGS. 1-3, e.g., without the user having to lift the thumb 114 from the display surface 104. Accordingly, the interface 602 may allow the user to use a single hand 116 for both holding or supporting the electronic device 100, and for interacting with and controlling a multimedia digital content item 124 being consumed on the electronic device 100.

In addition, as illustrated in the example of FIG. 6B, in any of the user interfaces disclosed herein, the location of the user interface on the display may change or may be presented localized to a sensed location of the user's thumb. For example, as illustrated in FIG. 6B, suppose that the user switches hands, e.g., from holding the device with the left hand 116 to holding the device with a right hand 606. The electronic device 100 may sense that the left thumb 114 is no longer present, and that instead a right thumb 608 is present and in contact with the display 102. As one example, in the case that the touch location sensor is a capacitive sensor, data from the touch location sensor may indicate not only a location of the touch input, but also a shape and orientation of the object used to make the touch input, i.e., the user's thumb.

Accordingly, in response to sensing the presence of the right thumb 608, the electronic device 100 may display the user interface 602 localized and oriented to the location of the right thumb 608, rather than to the left thumb 114. This may result in the interface 602 being presented in a mirror image of the interface 602 presented when the left thumb 114 is detected as being in contact with the display 102. Further, if the user were to grip the electronic device 100 at a location closer to a center 610 of the electronic device 100, the electronic device 100 may sense whether the user's right thumb or left thumb is currently being used to grip the electronic device 100, and may present the interface 602 localized to the current location of the thumb, and properly oriented for use by the respective sensed right or left thumb.

Additionally, the electronic device 100 may also sense a size of the user's thumb such that for a user having a larger hand and thumb, the thumb radius area 126 may be increased based on the sensed size of the thumb. Further, the size of the touch input areas 118 may be automatically increased and the distance of the touch input areas 118 from an edge 612 gripped by the hand 606 may be increased. Similarly, for a user with a smaller hand and thumb, the thumb radius area 126 may be automatically decreased, and the touch input areas 118 may be smaller, closer together and closer to the edge 612 gripped by the hand. Further, in the case that neither of the user's thumbs are sensed as being in a position for interacting with the thumb touch user interfaces herein, the electronic device 100 may present a convention touch input user interface in response to one or more touch inputs or other types of inputs by the user, rather than the thumb touch user interfaces herein.

Figure 7:
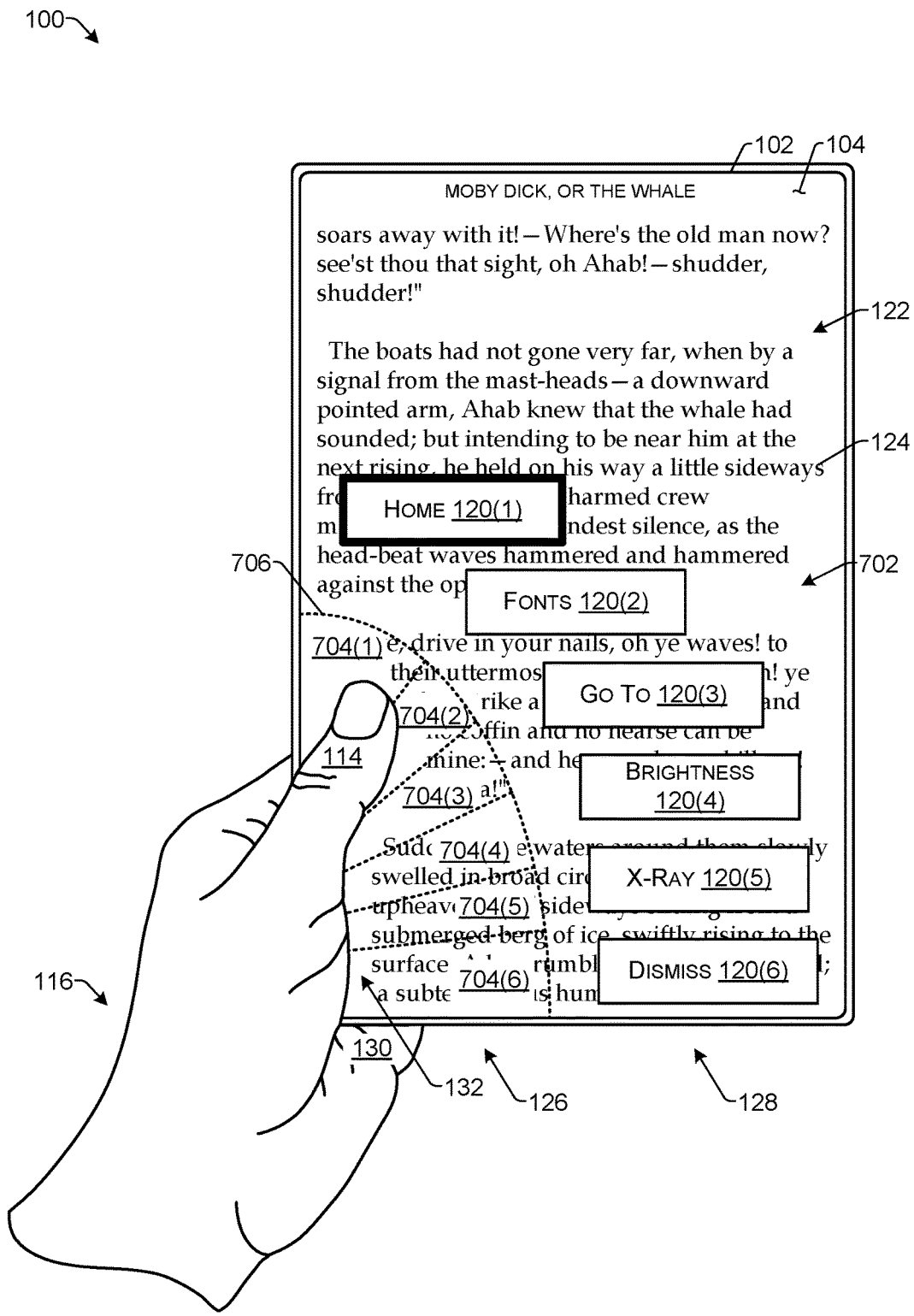
FIG. 7 illustrates an example thumb touch interface according to some implementations.

FIG. 7 illustrates an example thumb touch user interface 702 according to some implementations. The example user interface 702 of FIG. 7 illustrates a variation of the user interface 112 discussed above with respect to FIGS. 1-3. In this example, the user interface 702 includes a plurality of touch input areas 704(1) through 704(6) associated respectively with the selectable items 120(1) through 120(6). The touch input areas 704 in the thumb radius area 126 are contiguous with adjacent touch input areas 704. Accordingly, as the user moves the thumb 114 from one touch input area 704 to an adjacent touch input area 120, the corresponding selectable item 120 becomes highlighted or otherwise visually distinguished while the selectable item 120 corresponding to the previous touch input area 704 is no longer visually distinguished.

Furthermore, in some examples, a dashed line 706 or other graphical element may indicate the thumb radius area 126 and the touch input areas 704. In other examples, as discussed previously, the touch input areas 704 and the thumb radius area 126 may not be visually identified or otherwise represented on the display 102. In other words, in some examples, the dashed line 706 outlining the thumb radius area 126 and the touch input areas 704 in FIG. 7 are shown here for discussion purposes, and may not actually be displayed on the display 102 with the interface 702. Of course, in other examples, the dashed line 706 outlining the thumb radius area 706 and/or the touch input areas 704 may be displayed to assist the user in moving the thumb 114 to a desired touch input area 704.

Figure 8:
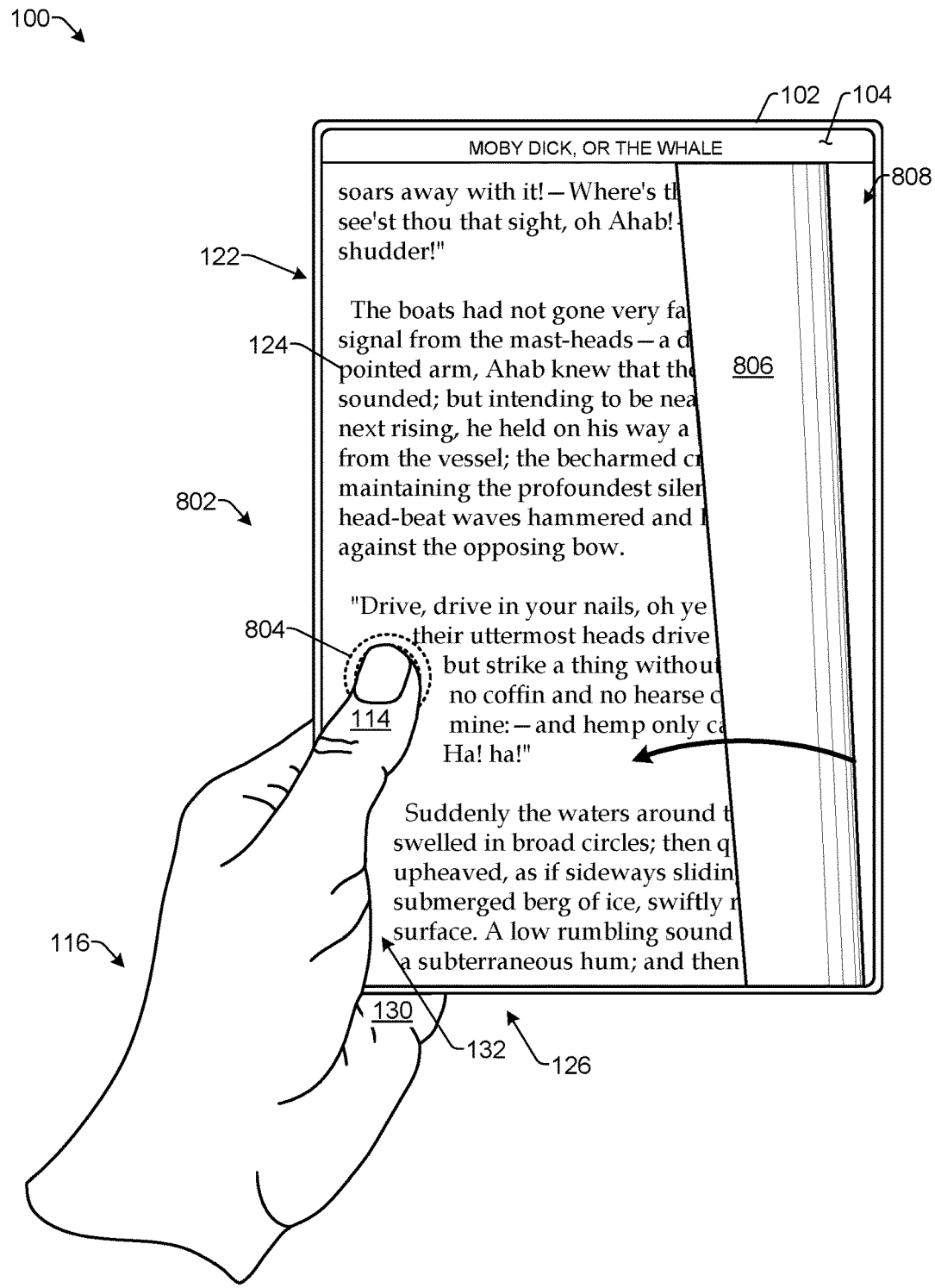
FIG. 8 illustrates an example thumb touch interface according to some implementations.

FIG. 8 illustrates an example thumb touch user interface 802 according to some implementations. In this example, the user may grasp the electronic device 100 in a single hand with the thumb 114 touching the display surface 104 within the thumb radius area 126. Suppose that the user is viewing a digital content item 124 such as an electronic book or other text item having multiple pages in the interface 122, as discussed above. The user may press the thumb 114 against the display surface 104 with a force that exceeds a threshold amount, as indicated by dashed lines 804. As a result of detecting the force of the touch input from the thumb 114 being greater than the threshold amount, the interface 122 presenting the content item 124 may cause a page 806 of the content item 124 to turn to present a next page 808. Additionally, in some examples, as discussed above, if the user squeezes or presses with a force above the threshold level and for more than a threshold period of time, the device 100 may present the user interface 112 or the other thumb touch interfaces discussed above, rather than turning the page. Thus, the user may squeeze and release to turn the page, or squeeze and hold to cause presentation of the user interface 112. Furthermore, while the foregoing describes several examples by which the user interface 112 may be presented, numerous other examples will be apparent to those of skill in the art having the benefit of the disclosure herein.

Figure 9:
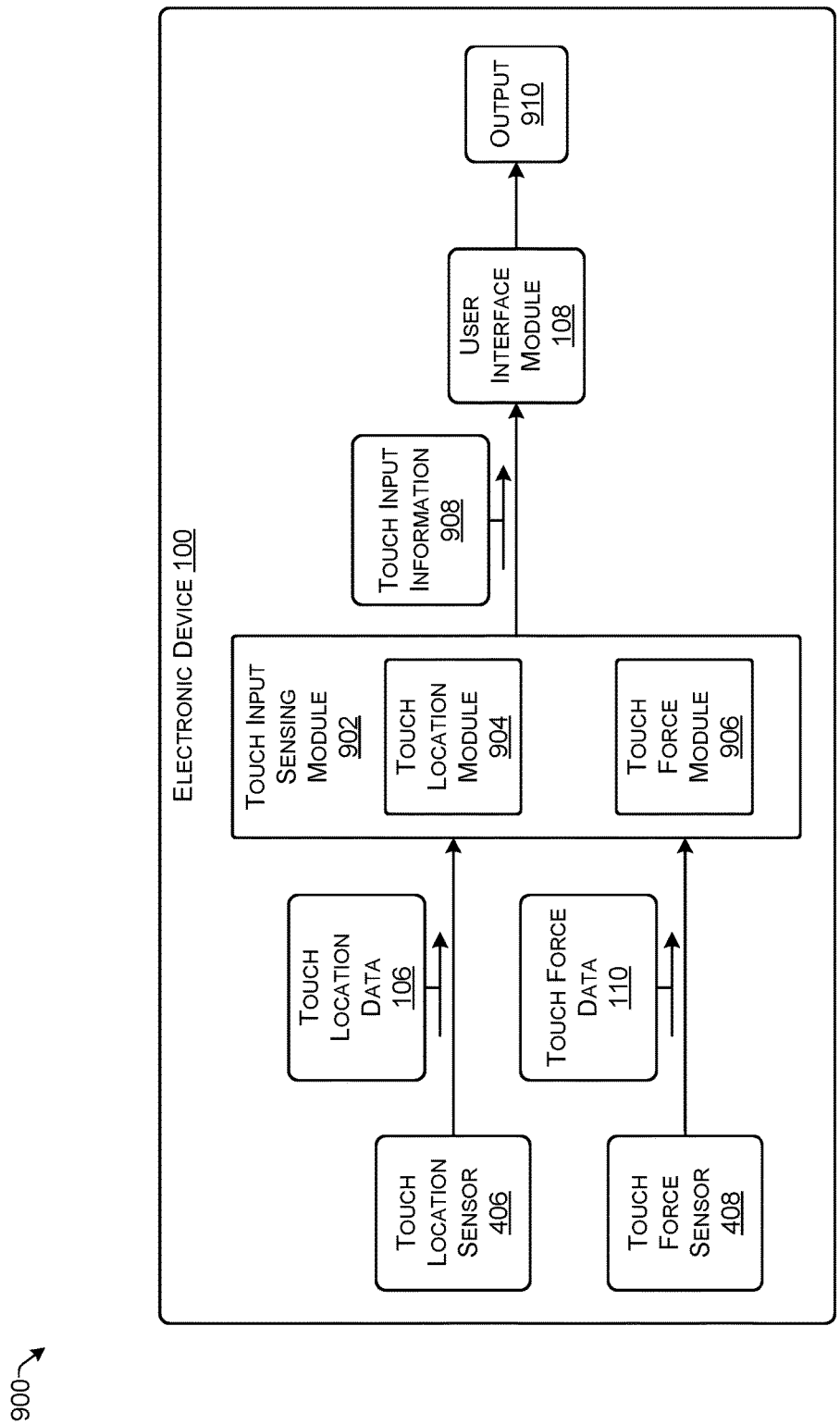
FIG. 9 illustrates an example framework for a thumb touch interface on an electronic device according to some implementations.

FIG. 9 illustrates an example framework 900 that may be executed on the electronic device 100 for enabling user interaction with a user interface according to some implementations. In this example, the electronic device 100 includes the user interface module 108 that may be executed on the electronic device 100, the touch location sensor 406 and the touch force sensor 408, as discussed above. The electronic device 100 may include a touch input sensing module 902 that may be part of the user interface module 108 or separate therefrom. The touch input sensing module 902 can include a touch location module 904 that receives the touch location data 106 from the touch location sensor 406. Furthermore, the touch input sensing module 902 can include a touch force module 906 that receives touch force data 110 from the touch force sensor 408. For example, the touch location data 106 may include capacitive charge information received from a grid of conductors associated with the display 102, such as overlaid on top of the display 102 or positioned underneath the display 102. Furthermore, in some examples, the touch force data 110 may include signal information obtained from a resistive force sensor indicative of a force applied to the display surface. Additionally, in some examples, the touch location sensor 406 and the touch force sensor 408 may be a single sensor such as a capacitive sensor. For instance, the capacitive sensor may indicate a change in shape of the thumb surface in addition to a location on the display that the thumb is touching for indicating both force and location of a touch input. Numerous other possible types of inputs and sensor information for determining touch location data 106 and touch force data 110 may be employed in the implementation's herein, with the foregoing being merely examples.

The touch input sensing module 902 may determine a location of a touch input from the touch location data 106 and a force associated with the touch input from the touch force data 110 and may provide this information as touch input information 908 to the user interface module 108. The user interface module 108 may determine an output 910 that corresponds to the touch input information 908. For example, as discussed above with respect to FIGS. 1-3, if the touch input information 908 indicates that the user touched the display surface at a location corresponding to a particular touch input area 118 with a force that exceeds a threshold amount of force, the user interface module 108 may determine that the user has made a selection of a particular selectable item 120. Accordingly, the output 910 may include instructions to modify an image currently displayed on the display 102 in accordance with the selection of the particular selectable item 120.

Figure 10:
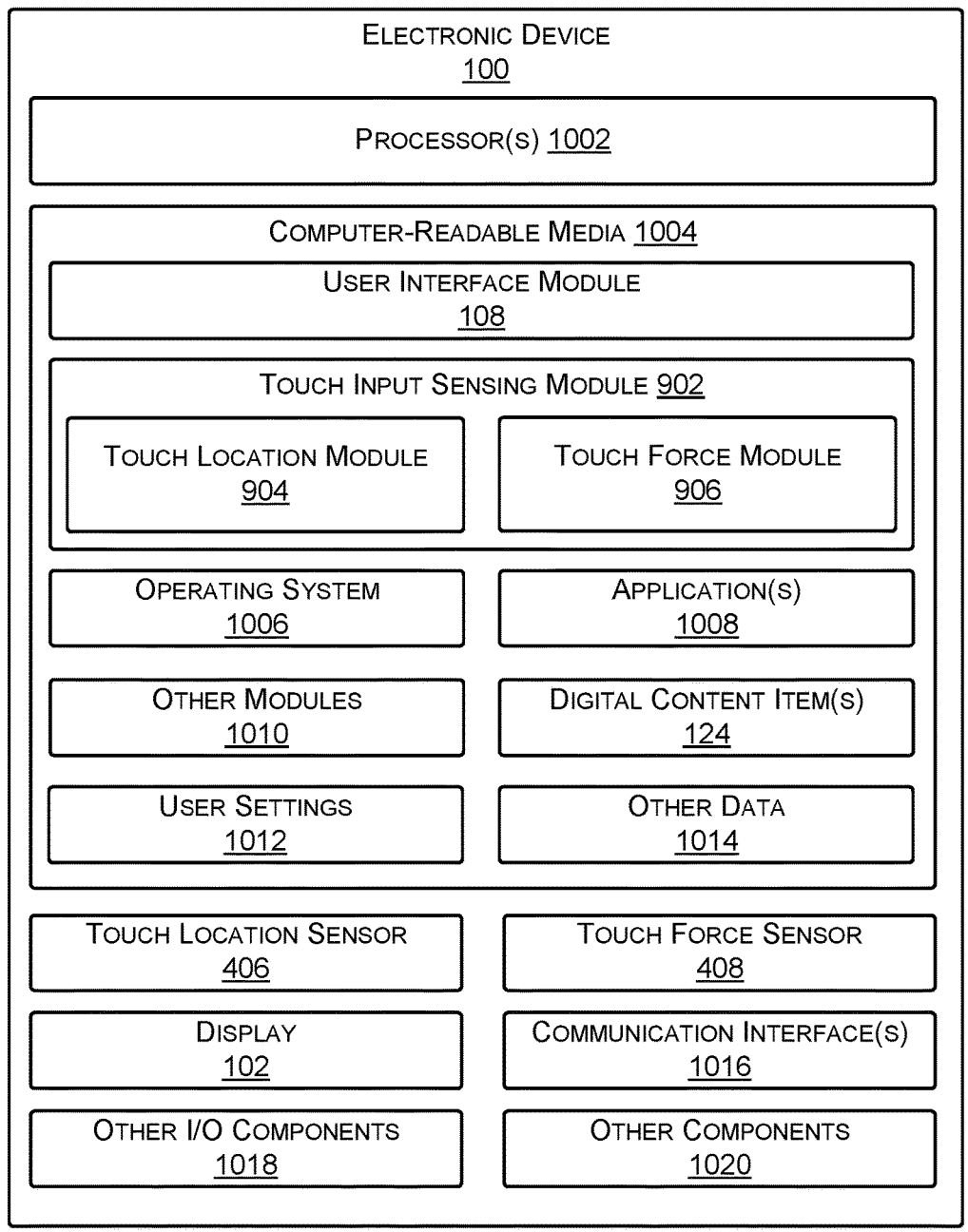
FIG. 10 illustrates select components of an example electronic device according to some implementations.

FIG. 10 illustrates select example components of the electronic device 100 that may be used to implement the techniques and functions described above according to some implementations. In a very basic configuration, the electronic device 100 includes, or accesses, components such as at least one control logic circuit, central processing unit, or processor 1002 and one or more computer-readable media 1004. Each processor 1002 may itself comprise one or more processors or processing cores.

Depending on the configuration of the electronic device 100, the computer-readable media 1004 may be an example of tangible non-transitory computer storage media and may include volatile and nonvolatile memory and/or removable and non-removable media implemented in any type of technology for storage of information, such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the electronic device 100 may access external storage, such as RAID storage systems, storage arrays, network attached storage, storage area networks, cloud storage, or any other medium that can be used to store information and that can be accessed by the processor 1002 directly or through another computing device or network. Accordingly, the computer-readable media 1004 may be computer storage media able to store instructions, modules or components that may be executed by the processor 1002.

The computer-readable media 1004 may be used to store and maintain any number of functional components that are executable by the processor 1002. In some implementations, these functional components comprise instructions or programs that are executable by the processor 1002 and that, when executed, implement operational logic for performing the actions attributed above to the electronic device 100. Functional components of the electronic device 100 stored in the computer-readable media 1004 may include the user interface module 108, executable by the processor 1002 for presenting the user interfaces described herein, such as the user interfaces 112, 302, 502, 602, 702 and/or 802 discussed above. Additional functional components stored in the computer-readable media 1004 may include the touch input sensing module 902, which may include the touch location module 904 and touch force module 906, as described above, and which may be part of the user interface module 108, or separate therefrom. Furthermore, while the user interface module 108, the touch sensing input module 902, the touch location module 904 and the touch force module 906 are described separately herein for convenience of discussion, these modules may all be combined as a single piece of executable code or incorporated into a single computer program, application, operating system, or the like.

Other functional components of the electronic device 100 may include an operating system 1006 for controlling and managing various functions of the electronic device 100 and providing basic functionality. Any or all of the modules 108, 902, 904, 906 may be integrated into the operating system 1006, or alternatively, may be operable separately therefrom. Additionally, the computer-readable media 1004 may include one or more applications 1008, such as one or more mobile applications, that may be executed when using the electronic device 100 to perform various functions and uses, as well as other modules 1010, depending on the use and purpose of the electronic device 100. In some cases, the user interface module 108, the touch input sensing module 902, the touch location module 904, and the touch force module 906 may be included in an application 1008.

In addition, the computer-readable media 1004 may also store data, data structures and the like, that are used by the functional components. For example, data stored by the computer-readable media 1004 may include user settings 1012, such as user preferences and settings for the user interfaces 112, 302, 502, 602, 702 and/or 802 described herein. Examples of user settings 1012 may include the ability to specify a type of input that causes the thumb touch interface to be presented; a threshold setting regarding how much force is required for a touch input to register as a selection of a selectable item; whether graphical elements indicating the touch input areas are displayed; characteristics of the graphical elements indicating the touch input areas, such as shape, transparency, outlining, etc; characteristics of how the selectable items are visually distinguished from one another; whether a carousel interface or non-moving interface is presented when the total number of selectable items will not fit in the display area, and so forth. Further, in some examples, the touch force sensor 408 may be calibrated for a particular user. For example, an adult may touch the electronic device using different levels of force than a child.

Further, the user settings 1012 may include whether the user predominantly uses a left hand or right hand to grasp the electronic device 100, so as to be predisposed to display the thumb touch interfaces oriented for left hand or right hand use. However, as discussed above with respect to FIG. 6B, some implementations of the thumb touch interfaces herein are presented based on sensing the presence and location of the thumb on the display surface 104, and thus may select whether to present a left-handed oriented interface or a right-handed oriented interface based at least in part on the location of the detected thumb on the display surface. For instance, in some examples, the touch location sensor 406 may be able to detect the presence and shape of a thumb near to or touching the display 102, and the user interface module 108 may use this information for determining whether to activate the thumb touch interface or a conventional touch interface. In addition, the user interface may be localized to the sensed thumb, regardless of the location at which the user grasps the electronic device. For example, as discussed above with respect to FIG. 6B, the user may adjust the location of the grip on the electronic device 100, move the electronic device 100 from one hand to the other, or the like, and the thumb touch user interface may be moved or re-oriented for the currently sensed location and orientation of the user's thumb.

In some examples, the electronic device 100 may include one or more digital content items 124, such as electronic books, movies, television shows, personal documents, music, games, and so forth. The electronic device 100 may further include various types of other data 1014, such as data used by the operating system 1006, and data used by the applications 1008 or the other modules 1010 described above. Further, the electronic device 100 may include many other logical, programmatic and physical components, of which those described are merely examples that are related to the discussion herein.

In some examples, the electronic device may include at least one communication interface 1016. The communication interface 1016 may include one or more interfaces and hardware components for enabling communication with various other devices, such as directly or over a network. For example, the communication interface 1016 may support both wired and wireless connection to various networks, such as cellular networks, radio, WiFi networks, short-range or near-field networks (e.g., Bluetooth®), infrared signals, local area networks, wide area networks, the Internet, and so forth. The communication interface 1016 may further allow a user to access storage on another device, such as a remote computing device, a network attached storage device, cloud storage, a local computing device or the like.

FIG. 10 further illustrates the display 102, which may be passive, emissive or any other form of display, and which may have the touch location sensor 406 and the touch force sensor 408 associated therewith. In addition, the electronic device 100 may include various other types of other input/output (I/O) components 1018 such as various user controls (e.g., buttons, a joystick, a keyboard, a keypad, etc.), one or more speakers, a haptic or tactile output device, connection ports, and so forth. For example, the operating system 1006 of the electronic device 100 may include suitable drivers configured to accept input from a keypad, keyboard, or other user controls and devices included as the I/O components 1020. For instance, the user controls may include page turning buttons, navigational keys, a power on/off button, selection keys, and so on. Additionally, the electronic device 100 may include various other components 1020, examples of which include a power source, such as a battery and power control unit, removable storage, a PC Card component and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 11:
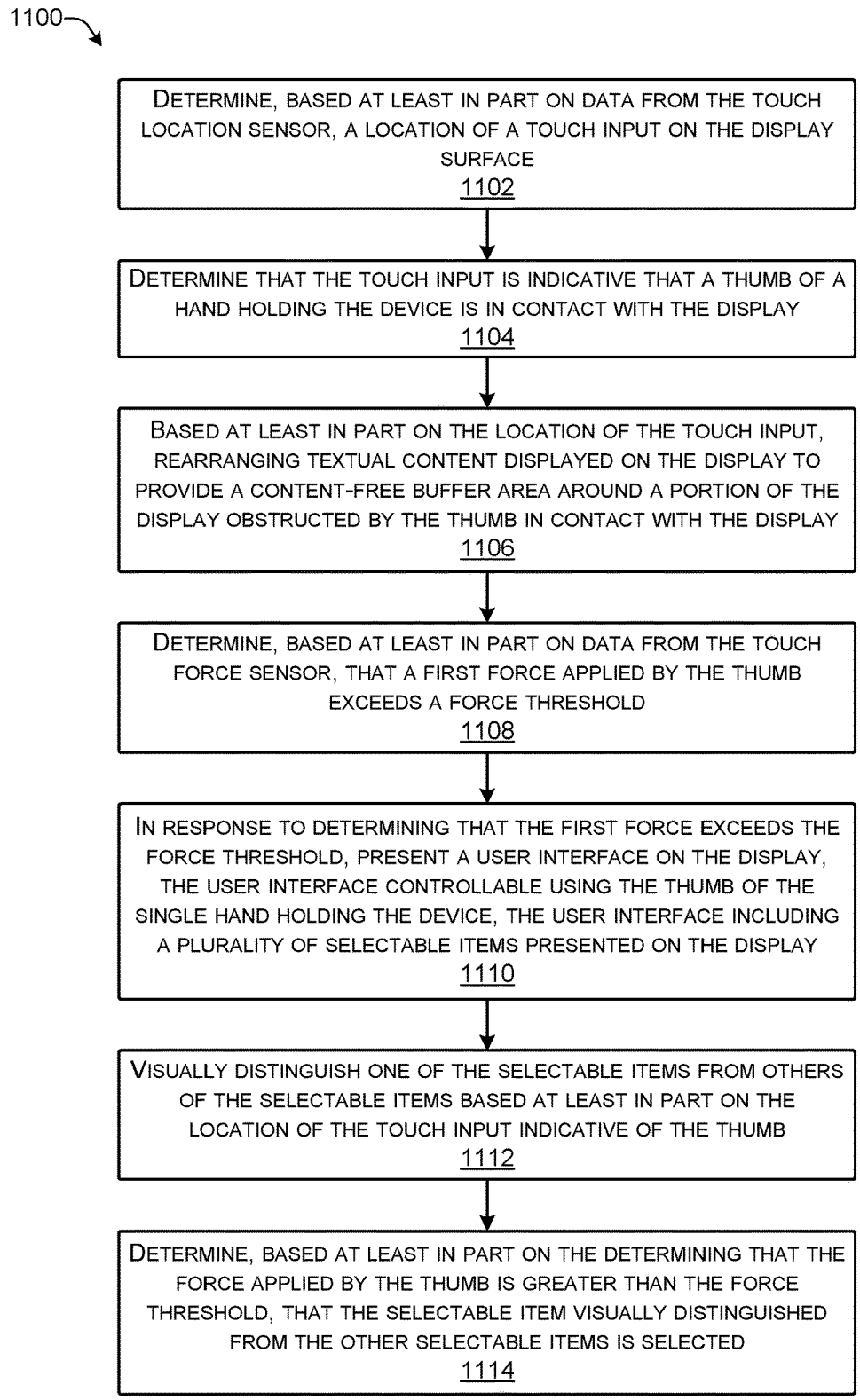
FIG. 11 is an example flow diagram of a process for interaction using a thumb touch interface according to some implementations.
Figure 12:
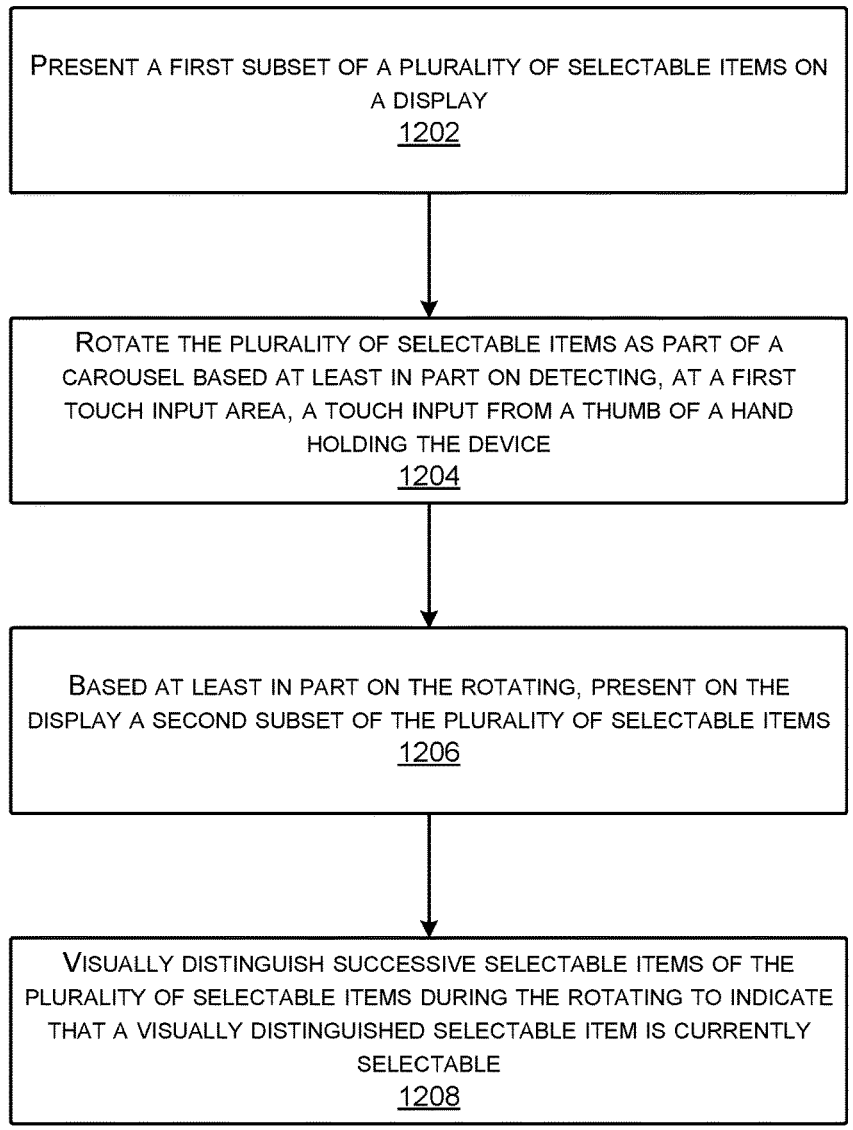
FIG. 12 is an example flow diagram of a process for interaction using a thumb touch interface according to some implementations.
Figure 13:
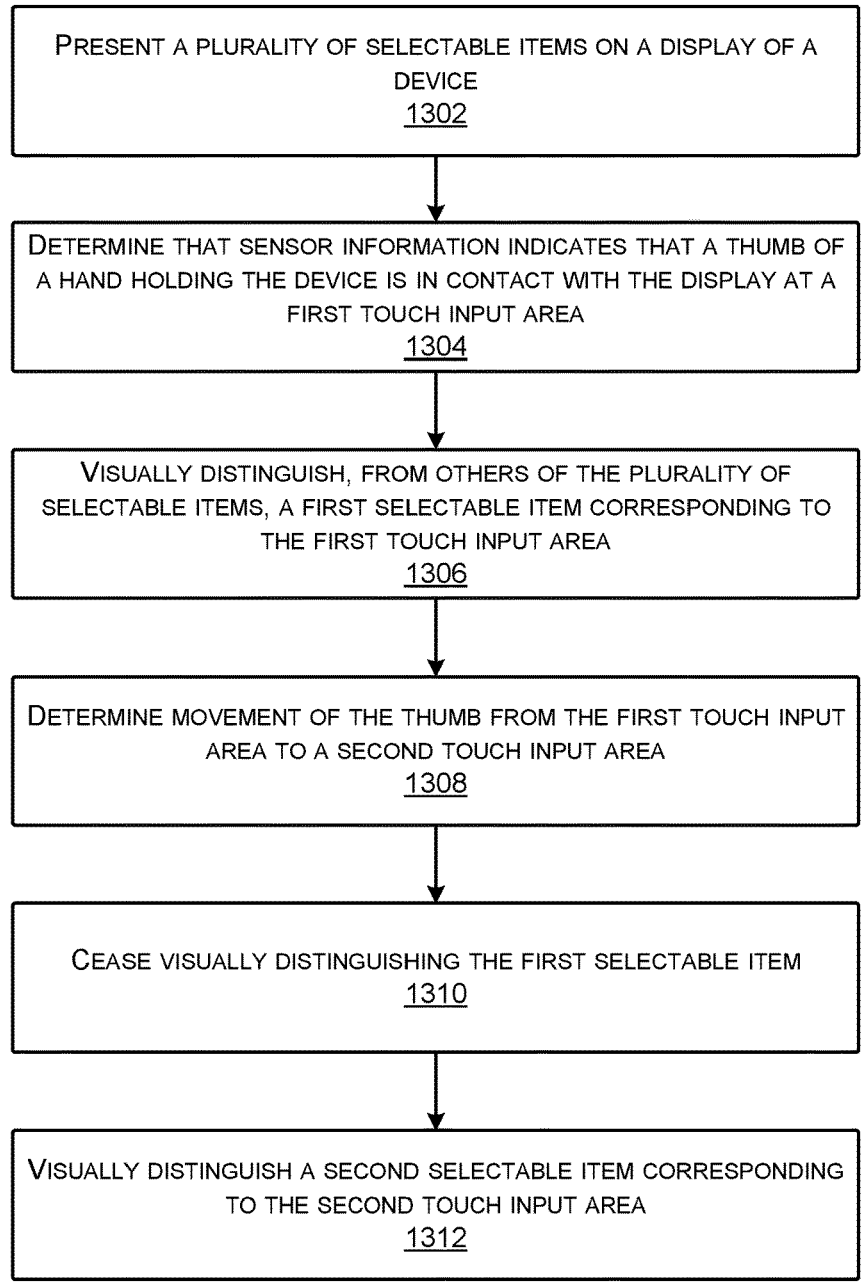
FIG. 13 is an example flow diagram of a process for interaction using a thumb touch interface according to some implementations.

FIGS. 11-13 show illustrative processes according to some implementations. The processes described herein may be implemented by the frameworks, architectures and systems described herein, or by other frameworks, architectures and systems. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. Further, not all of the blocks are executed in each implementation.

FIG. 11 is a flow diagram of a process 1100 according to some implementations. In some examples, the process 1100 may be executed, at least in part, by one or more modules, such as the touch input sensing module and the user interface module, as discussed above.

At 1102, the one or more modules determine, based at least in part on data from the touch location sensor, a location of a touch input on the display surface.

At 1104, the one or more modules determine that the touch input is indicative that a thumb of a hand holding the device is in contact with the display. For example, a location of the touch input may be indicative of a touch input from a thumb, rather than another digit. Further, the device may use a capacitive signature to detect that a thumb is in contact with the display surface, rather than another digit or input device. For example, a capacitive touch sensor may be calibrated to distinguish between the shape of a thumb and other digits of a hand, other body parts, or other input devices.

At 1106, the one or more modules, based at least in part on the location of the touch input, rearranging textual content displayed on the display to provide a content-free buffer area around a portion of the display obstructed by the thumb in contact with the display. For example, the device may rearrange text or other information displayed on the display to flow around the thumb determined to be in contact with the display.

At 1108, the one or more modules may determine, based at least in part on data from the touch force sensor, that a first force applied by the thumb exceeds a force threshold.

At 1110, in response to determining that the first force exceeds the force threshold, the one or more modules may present a user interface on the display, the user interface controllable using the thumb of the single hand holding the device, the user interface including a plurality of selectable items presented on the display. For example, in response to the user squeezing the display between the thumb and the palm of the user's hand for a length of time that exceeds a threshold time, and with a force that exceeds a threshold force, the electronic device may present a thumb touch user interface that includes a plurality of items that are selectable using thumb touch inputs. The user may then reduce the force applied by the thumb to less than the threshold force, while still maintaining contact of the thumb with the display to retain a secure grip on the device. Alternatively, rather than presenting the user interface in response to detecting an amount of force applied by the thumb, the user interface may be presented in response to detecting that a thumb is in contact with the display surface, rather than another digit or input device. For example, a capacitive touch sensor may be calibrated to distinguish between the shape of a thumb and other digits of a hand, other body parts, or other input devices. As one example, the touch sensor may determine that the thumb is contacting the display at a particular location, such as toward the center of the display, rather than near an edge, and may present the user interface in response to detecting the thumb at a particular location or in a particular position. When the interface has been displayed, the user may slide the thumb between a plurality of adjacent touch input locations while maintaining the contact of the thumb with the display at a force less than the threshold force, but sufficient to maintain a grip on the device. At 1112, the one or more modules may visually distinguish one of the selectable items from others of the selectable items based at least in part on the location of the touch input indicative of the thumb. For example, the user interface may highlight or otherwise visually distinguish one of the selectable items that corresponds to the touch input location, while the other selectable items are not visually distinguished.

At 1114, the one or more modules may determine, based at least in part on the determining that the force applied by the thumb is greater than the force threshold, that the selectable item visually distinguished from the other selectable items is selected. For example, the electronic device may determine that the particular selectable item has been selected based on the user's thumb touch input, and the electronic device may respond accordingly in response to the selection. In some cases, data from a force sensor may be used to determine that the force applied by the thumb at the touch input location is greater than a force threshold, thereby indicating the user is making a selection. Thus, when the user desires to make a selection, the user may squeeze with the thumb with a force greater than the threshold force to indicate a selection of the highlighted item.

FIG. 12 is a flow diagram of a process 1200 according to some implementations. In some examples, the process 1200 may be executed, at least in part, by one or more modules such as the touch input sensing module and the user interface module, as discussed above.

At 1202, the one or more modules may present a first subset of a plurality of selectable items on a display. For example, in response to a user interaction, the electronic device may present a thumb touch interface that includes a plurality of selectable items.

At 1204, the one or more modules may rotate the plurality of selectable items as part of a carousel based at least in part on detecting, at a first touch input area, a touch input from a thumb of a hand holding the device. For example, the user may place a thumb of the hand holding the device onto a first touch input area, which may cause the items in the carousel to begin rotating.

At 1206, based at least in part on the rotating, the one or more modules may present on the display a second subset of the plurality of selectable items. For example, as the carousel rotates in response to the user's thumb touch input, successive different subsets of the plurality of selectable items are presented on the display.

At 1208, the one or more modules may visually distinguish successive selectable items of the plurality of selectable items during the rotating to indicate that a visually distinguished selectable item is currently selectable. For example, as each selectable item passes through a focus area, that selectable item may be temporarily highlighted while in the focus area. Subsequently, the user may stop the rotation of the carousel and select a visually distinguished one of the selectable items, such as by squeezing to apply a force greater than a force threshold.

FIG. 13 is a flow diagram of a process 1300 according to some implementations. In some examples, the process 1300 may be executed, at least in part, by one or more modules, such as the touch input sensing module and the user interface module, as discussed above.

At 1302, the one or more modules may present a plurality of selectable items on a display of a device. For example, the device may present a thumb touch user interface that may be interacted with by a thumb of a hand holding the device.

At 1304, the one or more modules may determine that sensor information indicates that a thumb of a hand holding the device is touching the display at a first touch input area. For example, the user may place the thumb at a first touch input area on the display. The device may determine, such as based on a capacitive profile, that sensor information indicates it is likely that the user is touching the device with a thumb of a hand holding the device, such as in a grip similar to that illustrated in FIG. 1

At 1306, the one or more modules may visually distinguish, from others of the plurality of selectable items, a first selectable item corresponding to the first touch input area.

At 1308, the one or more modules may determine movement of the thumb from the first touch input area to a second touch input area. For example, the second touch input area may be associated with a second one of the selectable items.

At 1310, the one or more modules may cease visually distinguishing the first selectable item.

At 1312, the one or more modules may visually distinguish a second selectable item corresponding to the second touch input area. For example, the user may subsequently select the second selectable item by squeezing the display with a force that exceeds a force threshold.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A portable electronic device comprising:
   a display panel having a display surface;
   a touch location sensor associated with the display panel;
   one or more processors;
   one or more computer-readable media; and
   one or more components maintained on the one or more computer-readable media that, when executed by the one or more processors, cause the one or more processors to perform operations that include:
   determining, based at least in part on first data from the touch location sensor, a location of a first touch input by an object on the display surface;
   determining, based at least in part on the first data, a content-free buffer area on the display surface around at least a portion of the display surface obstructed by the object;
   determining, based at least in part on second data, that a first force associated with the first touch input exceeds a force threshold;
   based at least in part on a determination that the first force exceeds the force threshold and based at least in part on the location of the first touch input, presenting a user interface via the display surface, the user interface presenting one or more selectable items outside of the content-free buffer area of the display surface;
   determining, based at least in part on third data representing a second touch input within the content-free buffer area, that the object moved within the content-free buffer area while maintaining contact with the display surface;
   based at least in part on the object maintaining contact with the display surface, continuing to present the user interface;
   determining, based at least in part on fourth data, that a second force associated with the second touch input is greater than the force threshold; and
   determining, based at least in part on the second force being greater than the force threshold, a selection of a selectable item of the one or more selectable items.

2. The portable electronic device of claim 1, further comprising, based at least in part on the location of the first touch input, rearranging content displayed via the display surface around the content-free buffer area of the display surface.

3. The portable electronic device of claim 1, further comprising determining that the first touch input is indicative of a thumb of a hand holding the portable electronic device being in contact with the display surface.

4. The portable electronic device of claim 1, wherein the location is a first location in the content-free buffer area, and the operations further comprising, visually distinguishing the selectable item from one or more other selectable items of the one or more selectable items based at least in part on the third data representing the second touch input within the content-free buffer area.

5. The portable electronic device of claim 1, wherein presenting the user interface via the display is further based at least in part on determining that the first force associated with the first touch input exceeds the force threshold for a length of time greater than a time threshold.

6. The portable electronic device of claim 1, wherein determining the content-free buffer area further comprises:
   determining a size of the object on the display surface; and
   configuring, based at least in part on the size of the object, the content-free buffer area.

7. A method comprising:
   receiving a touch input via a display surface of a display panel of a device;
   determining, based at least in part on the touch input, a content-free buffer area on the display surface;
   receiving, by a processor of the device, sensor data indicating that a force associated with the touch input in the content-free buffer area exceeds a force threshold, the force being detected by a touch force sensor that is positioned on a side of the display panel that is opposite the display surface; and
   causing, based at least in part on the force exceeding the force threshold, presentation of one or more selectable items via the display surface outside of the content-free buffer area of the display surface.

8. The method as recited in claim 7, wherein causing presentation of the one or more selectable items outside of the content-free buffer area of the display surface is further based at least in part on determining that the first force associated with the touch input exceeds the force threshold for a length of time greater than a time threshold.

9. The method as recited in claim 7, wherein the touch input is a first touch input, the sensor data is first sensor data, and further comprising:
   receiving a second touch input within the content-free buffer area;
   receiving, by the processor of the device, second sensor data indicating a first location on the display surface of the second touch input within the content-free buffer area; and
   visually distinguishing a selectable item of the one or more selectable items based at least in part on a proximity of the first location to a second location on the display surface at which the selectable item is presented.

10. The method as recited in claim 9, wherein the force is a first force, and further comprising:
    receiving, by the processor of the device, third sensor data indicating that a second force associated with the second touch input within the content-free buffer area is greater than the force threshold; and
    determining, based at least in part on the second force being greater than the force threshold, a selection of the selectable item.

11. The method as recited in claim 10, further comprising:
determining that the first touch input and the second touch input are caused by an object coming in physical contact with the display surface; and
receiving, by a processor of the device, fourth sensor data indicative of the object remaining in physical contact with the display surface during a time between a first instance of the first touch input and a second instance of the second touch input.

12. The method as recited in claim 7, wherein the sensor data is first sensor data, and further comprising:
receiving, by the processor of the device, second sensor data indicating a location on the display surface of the touch input; and
based at least in part on the location of the touch input, rearranging content displayed on the display surface around the content-free buffer area of the display surface obstructed by an object that is causing the touch input.

13. The method as recited in claim 7, further comprising determining that the touch input is indicative of a thumb of a hand holding the device being in contact with the display surface.

14. A device comprising:
a display panel comprising a display surface;
one or more sensors;
one or more processors;
one or more computer-readable media; and
one or more components maintained on the one or more computer-readable media and executed by the one or more processors to perform operations comprising:
determining, based at least in part on first data from the one or more sensors, a location of a touch input on the display surface;
determining, based at least in part on the first data, a content-free buffer area on the display surface;
causing presentation of one or more selectable items via the display surface outside of the content-free buffer area of the display surface;
determining that the location of the touch input is associated with a selectable item of the one or more selectable items;
determining, based at least in part on second data from the one or more sensors, that a force associated with the touch input within the content-free buffer area exceeds a force threshold; and
determining, based at least in part on the force being greater than the force threshold, a selection of the selectable item.

15. The device as recited in claim 14, wherein the force is a first force, the touch input is a first touch input within the content-free buffer area, and wherein causing presentation of the one or more selectable items via the display surface is based at least in part on determining that a second force within the content-free buffer area associated with a second touch input exceeds the force threshold.

16. The device as recited in claim 14, wherein the touch input is a first touch input, and the operations further comprising rotating the one or more selectable items as part of a carousel based at least in part on detecting a second touch input within the content-free buffer area at a first touch input area of the display surface, wherein the first touch input area of the display surface is separate from a second area of the display surface at which the one or more selectable items are presented.

17. The device as recited in claim 16, the operations further comprising visually distinguishing successive selectable items of the one or more selectable items while the one or more selectable items are being rotated to indicate that a visually distinguished selectable item is currently selectable.

18. The device as recited in claim 16, the operations further comprising:
determining that the first touch input and the second touch input are caused by an object coming in physical contact with the display surface; and
receiving, by the one or more processors, third data from the one or more sensors indicative of the object remaining in physical contact with the display surface during a time between a first instance of the first touch input and a second instance of the second touch input.

19. The device as recited in claim 14, wherein presenting the one or more selectable items on the display is further based at least in part on determining that the force associated with the touch input exceeds the force threshold for a length of time greater than a time threshold.

20. The device as recited in claim 14, wherein the one or more sensors comprise a touch force sensor positioned on a side of the display panel opposite the display surface, the touch force sensor being configured to detect a touch input force applied to the display surface.

* * * * *